(12) United States Patent
Bosscher

(10) Patent No.: US 11,633,853 B2
(45) Date of Patent: Apr. 25, 2023

(54) DYNAMIC MANIPULATOR STRENGTH AUGMENTATION

(71) Applicant: Eagle Technology, LLC, Melbourne, FL (US)

(72) Inventor: Paul M. Bosscher, Melbourne, FL (US)

(73) Assignee: EAGLE TECHNOLOGY, LLC, Melbourne, FL (US)

(*) Notice: Subject to any disclaimer, the term of this patent is extended or adjusted under 35 U.S.C. 154(b) by 5 days.

(21) Appl. No.: 16/868,175

(22) Filed: May 6, 2020

(65) Prior Publication Data

US 2021/0347044 A1    Nov. 11, 2021

(51) Int. Cl.
    *B25J 9/16*    (2006.01)
    *B25J 5/00*    (2006.01)
    (Continued)

(52) U.S. Cl.
    CPC .............. *B25J 9/1646* (2013.01); *B25J 5/00* (2013.01); *B25J 9/1651* (2013.01); *B25J 13/02* (2013.01);
    (Continued)

(58) Field of Classification Search
    CPC . B25J 9/16; B25J 9/1628; B25J 9/1646; B25J 9/1651; B25J 5/00; B25J 5/005; B25J 5/002; B25J 5/007; B25J 13/00; B25J 13/02; B25J 13/025; G05B 19/00; G05B 19/02; G05B 19/18; G05B 19/4155; G05B 2219/40; G05B 2219/40269
    (Continued)

(56) References Cited

U.S. PATENT DOCUMENTS 9,002,518 B2    4/2015  Manzo et al.
2016/0034613 A1*    2/2016  Hazan .................... B25J 9/1664
                                              703/13

(Continued)

FOREIGN PATENT DOCUMENTS

CN          104526698 A      4/2015
EP            2485875 B1      4/2013

OTHER PUBLICATIONS

H. Cho, J. Min and J. Song, "Hybrid position and force control of a robot arm equipped with joint torque sensors," 2013 10th International Conference on Ubiquitous Robots and Ambient Intelligence (URAI), Jeju, 2013, pp. 577-579, doi: 10.1109/URAI.2013.6677423.

(Continued)

*Primary Examiner* — Khoi H Tran
*Assistant Examiner* — Sarah A Tran
(74) *Attorney, Agent, or Firm* — Fox Rothschild LLP; Carol E. Thorstad-Forsyth; Robert J. Sacco

(57) ABSTRACT

Systems (100) and methods (900) for controlling movement of an articulating arm having a plurality of joints. The methods comprise: receiving, by the controller, a command to perform a task by the articulating arm; ranking movements of the joints based on how much each said joint needs to move at a first time in order to follow the command; selecting a first subset of joints with top-ranked movements from the plurality of joints, where the subset of joints comprises less than a total number of joints contained in the plurality of joints; and causing only the joints of the first subset to move during a first timeslot of a plurality of timeslots.

20 Claims, 12 Drawing Sheets

(51) Int. Cl.
*B25J 13/02* (2006.01)
*G05B 19/4155* (2006.01)

(52) U.S. Cl.
CPC .................. *G05B 19/4155* (2013.01); *G05B 2219/40269* (2013.01)

(58) Field of Classification Search
USPC ....................................................... 700/253
See application file for complete search history.

(56) References Cited

U.S. PATENT DOCUMENTS

2019/0134821 A1* 5/2019 Patrick ..................... B25J 9/06
2020/0001452 A1* 1/2020 Zarrouk ................... B25J 9/08
2021/0122041 A1* 4/2021 Mottram .................. B25J 9/08

OTHER PUBLICATIONS

H. Wakamatsu, M. Yamanoi and K. Tatsuno, "Adaptive force control of robot arm with estimation of environmental stiffness," 2010 International Symposium on Micro-NanoMechatronics and Human Science, Nagoya, 2010, pp. 226-231, doi: 10.1109/MHS.2010.5669556.
Mann, Moshe P. et al. "Minimally actuated serial robot." Robotica 36 (2017): 408-426.
International Search Report issued in European Patent Application No. 21170376.4 dated Oct. 7, 2021.

* cited by examiner

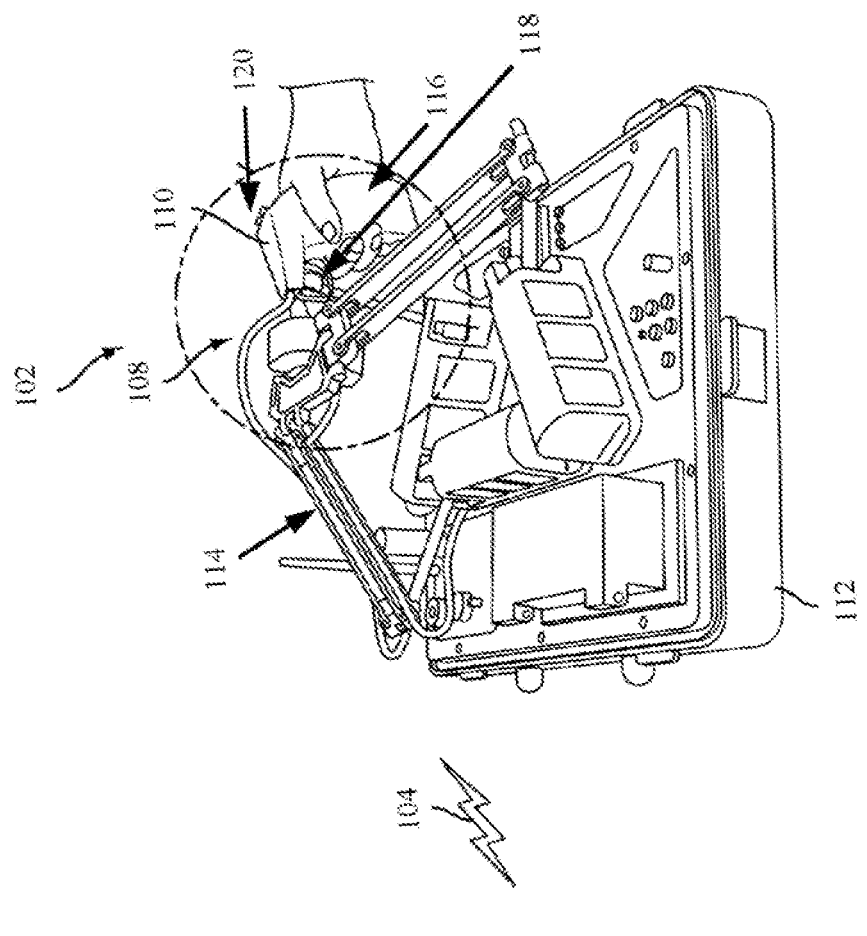
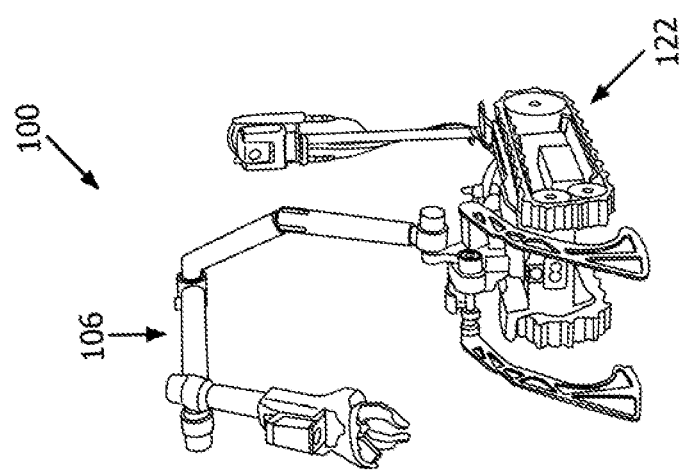
FIG. 1

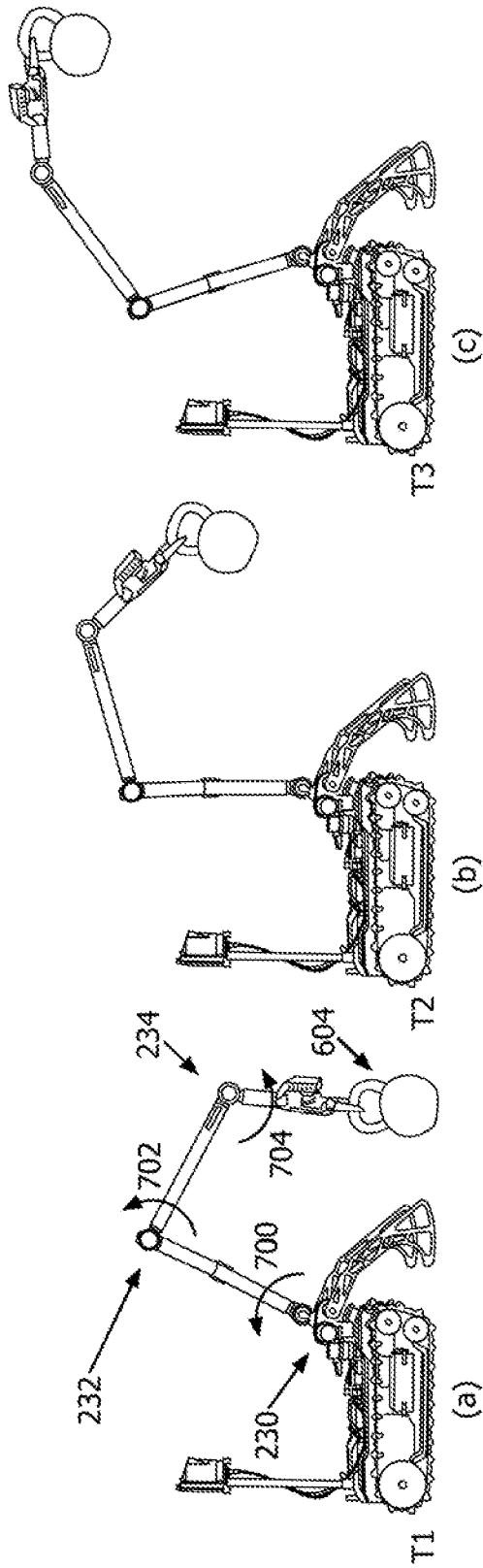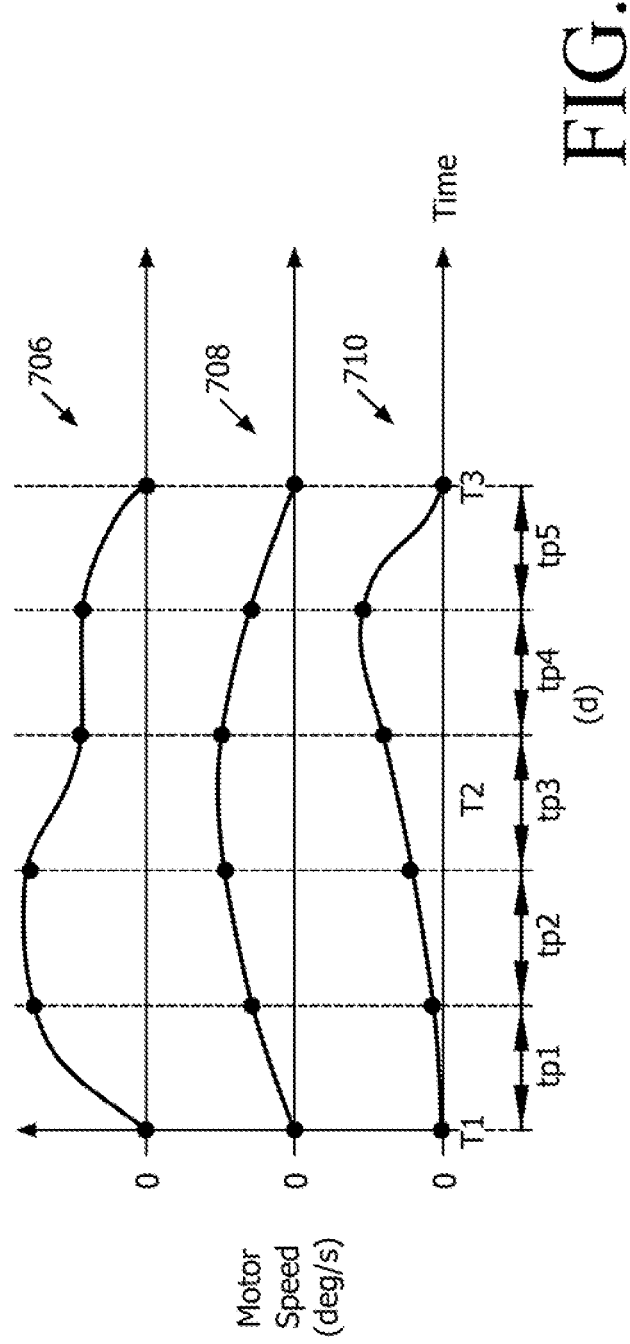
FIG. 7

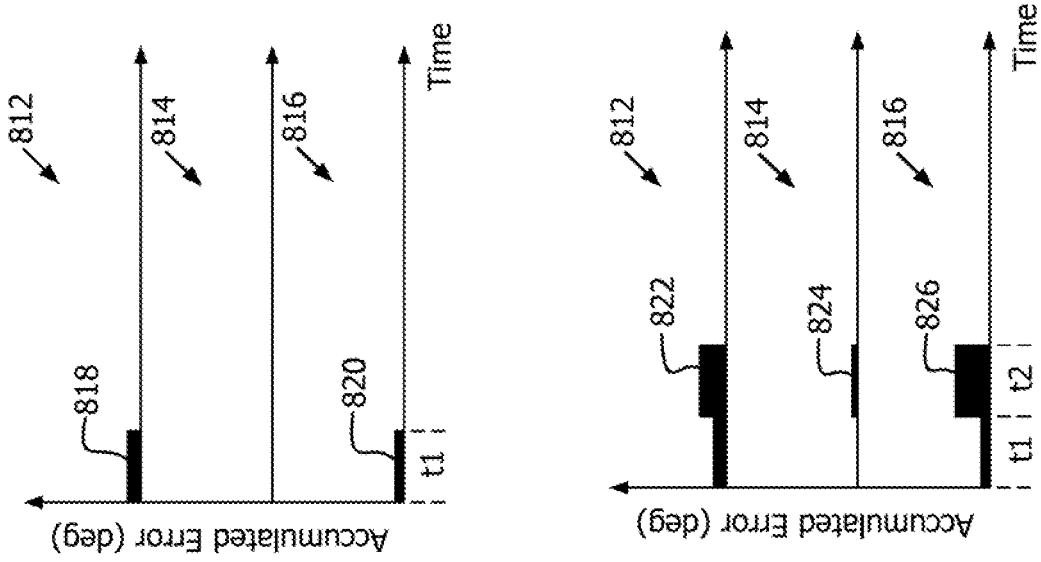
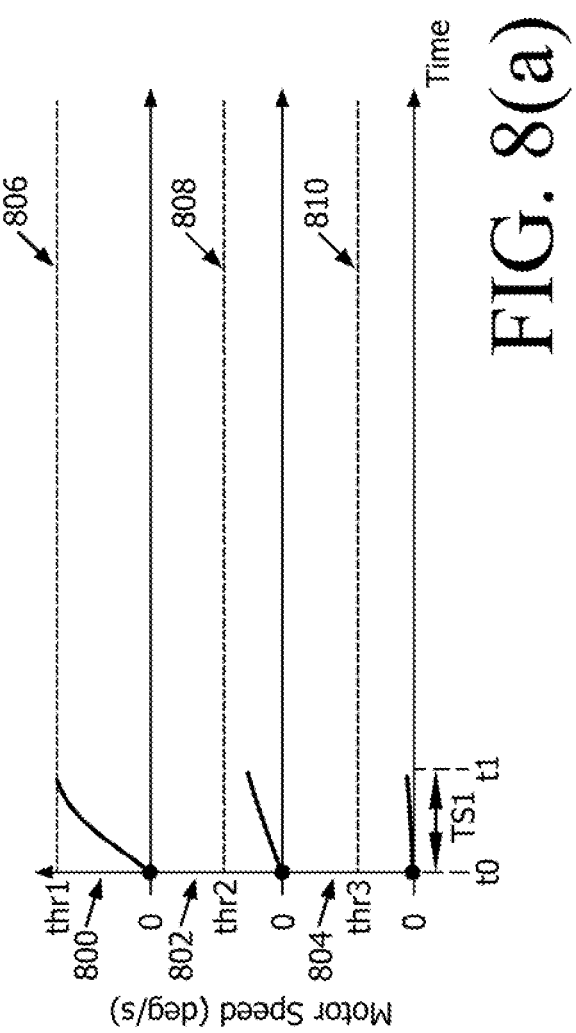
FIG. 8(a)
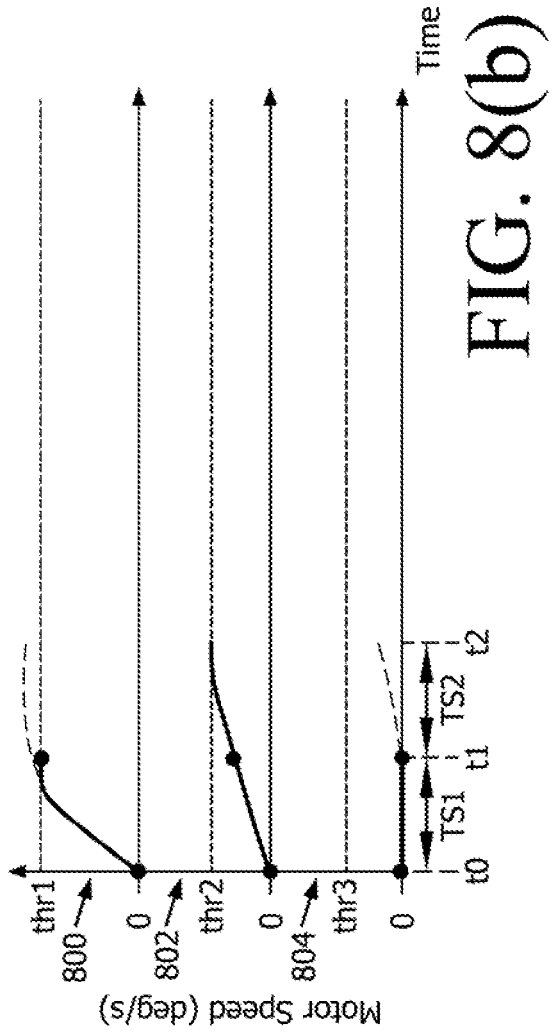
FIG. 8(b)

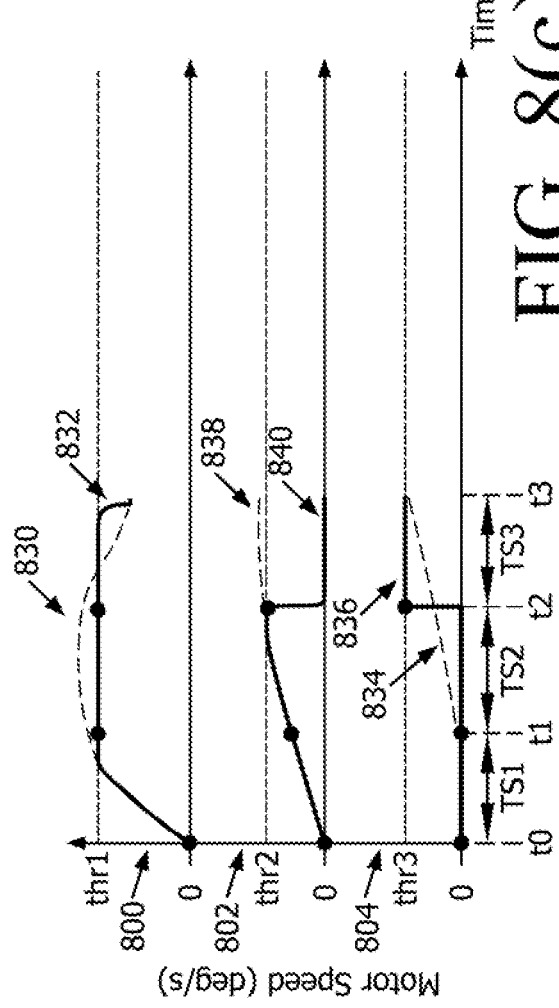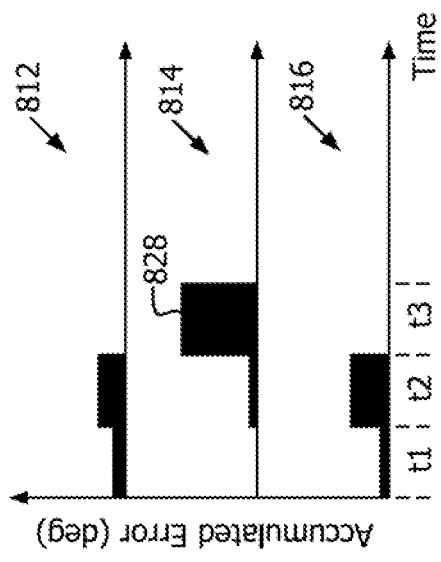
FIG. 8(c)
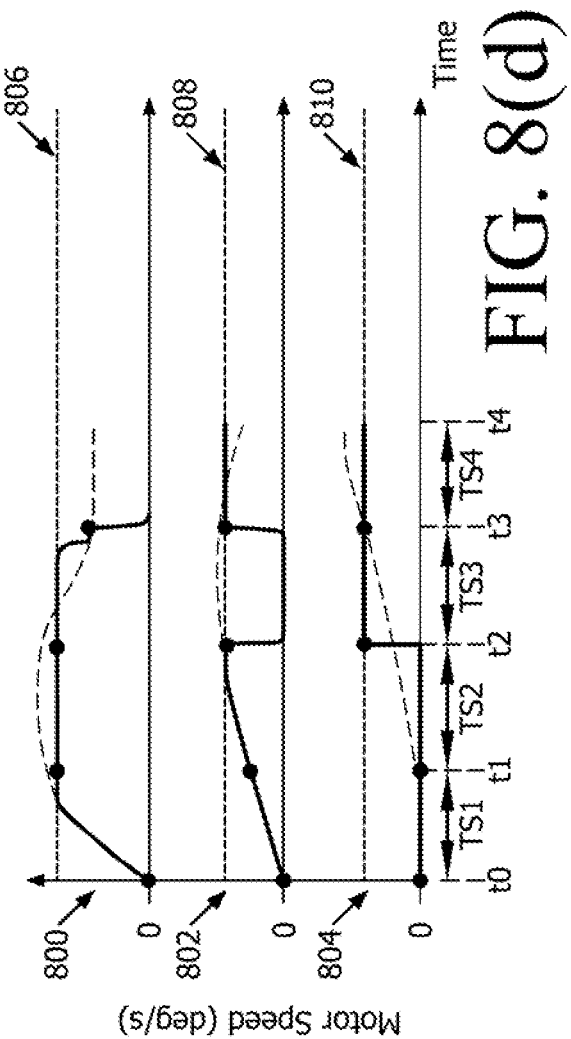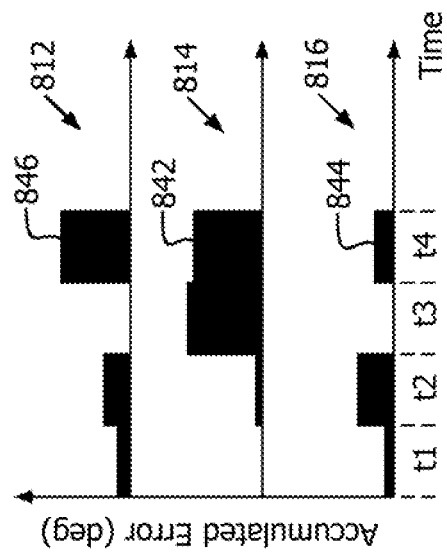
FIG. 8(d)

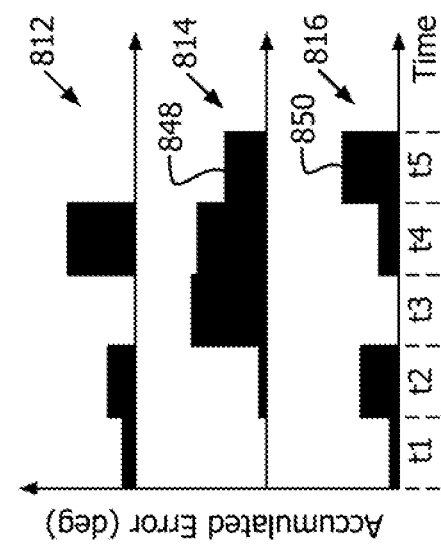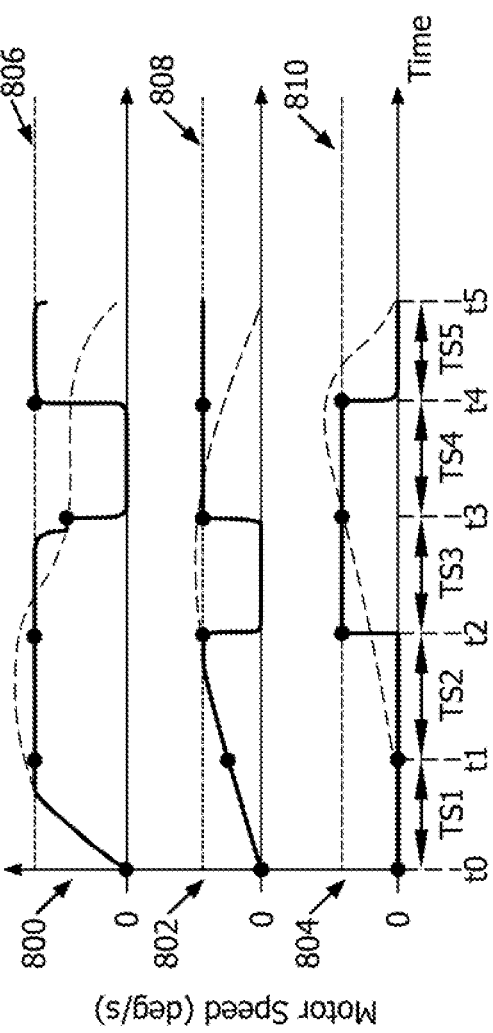
FIG. 8(e)
FIG. 8(f)

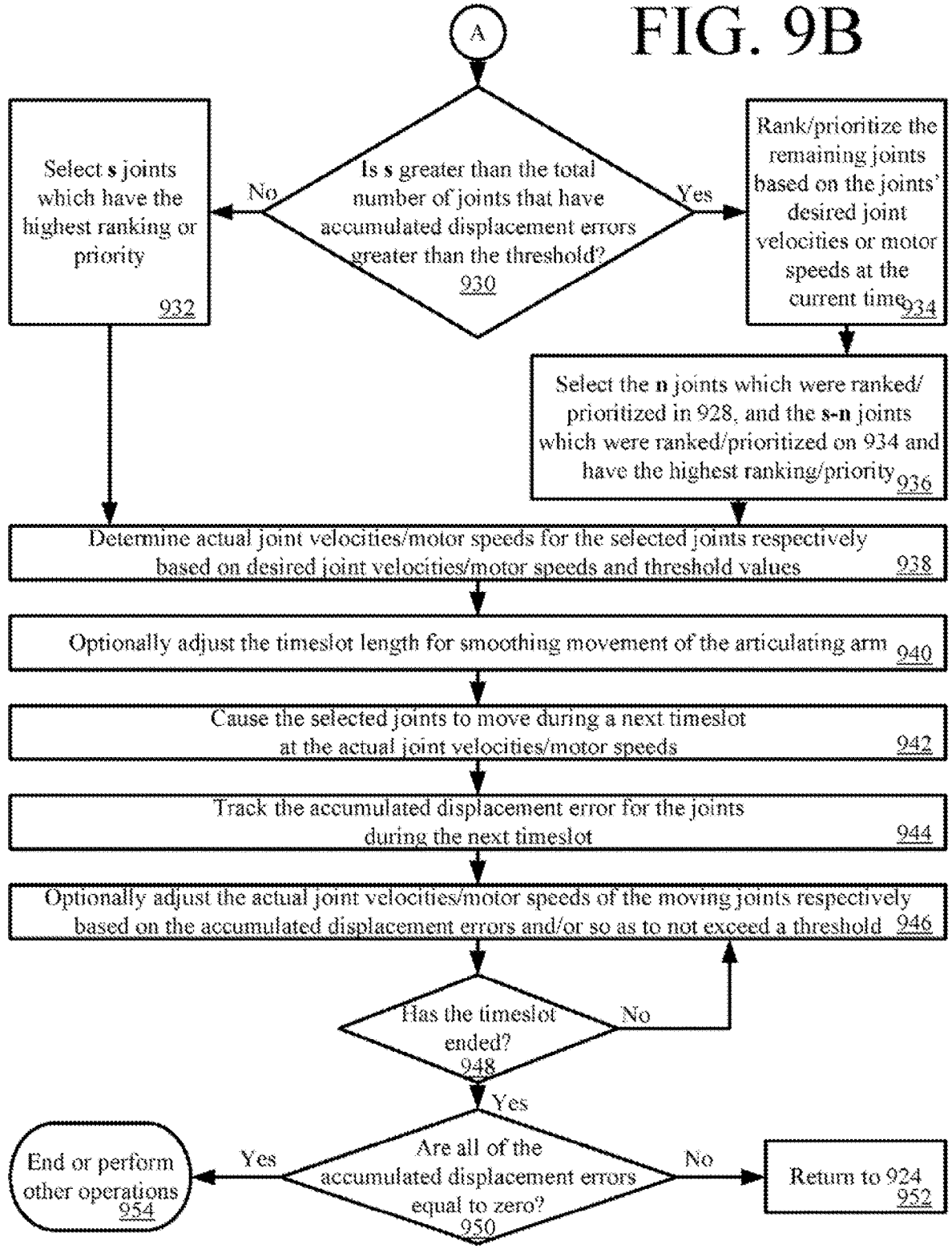

DYNAMIC MANIPULATOR STRENGTH AUGMENTATION

FIELD OF THE INVENTION

This document relates generally to Unmanned Ground Vehicles ("UGVs"). More particularly, this document relates to UGVs with dynamic manipulator strength augmentation.

BACKGROUND

UGVs are motorized vehicles that operate without an on-board human presence. Remotely-controlled and remotely-guided unmanned vehicles (such as UGVs) are in widespread use in applications such as Explosive Ordinance Disposal ("EOD"), search and rescue operations, hazardous material disposal, surveillance, etc. A typical UGV includes a chassis, wheels, drive motors mounted on the chassis, an articulating arm mounted on top of the chassis, grippers and a camera mounted on the arm. UGVs can also be equipped with steerable front wheels to facilitate directional control. Alternatively, UGVs can include tracks that facilitate operation over rough terrain. Steering of tracked UGVs can be effectuated by simultaneously operating the wheels or tracks on opposite sides of the UGV.

Movement and steering of a UGV can be controlled by a user from a location remote from the UGV using a joystick-equipped control unit. The control unit communicates with the UGV by way of a wireless communication link. The control unit may also be used to remotely control the UGV's robotic arm, gripper, and camera. The robotic arm of a UGVs is often used to lift and/or manipulate external objects. UGVs may not be able to supply enough power to support the robotic arm's performance of high strength tasks (e.g., lifting objects having weights ≥50 kilograms).

A first conventional solution to this power shortage issue is to add more batteries to the UGVs. However, this solution undesirably adds weight, volume and cost to the UGVs. A second conventional solution is to use higher gear ratios. The second conventional solution undesirably results in slower manipulator movement and requires additional hardware (e.g., transmission elements).

SUMMARY

The present disclosure concerns implementing systems and methods for controlling movement of an articulating arm having a plurality of joints. The methods comprise: receiving, by a controller, a command to perform a task by the articulating arm; ranking, by the controller, movements of the joints based on how much each said joint needs to move at a first time in order to follow the command; selecting, by the controller, a first subset of joints with top-ranked movements from the plurality of joints, where the subset of joints comprises less than a total number of joints contained in the plurality of joints; and causing, by the controller, only the joints of the first subset to move during a first timeslot of a plurality of timeslots.

The methods may also comprise: determining an actual joint velocity for each of the joints in the subset based on a threshold value and a desired joint velocity determined in accordance with an algorithm for simultaneously controlling movements of said joints; and/or changing the actual joint velocity during the first timeslot based on an accumulated displacement error and/or so as to not exceed a predefined threshold.

Alternatively or additionally, the methods further comprise: tracking accumulated displacement errors for the plurality of joints during the first timeslot; identifying first joints from the plurality of joints by comparing each magnitude of the accumulated displacement errors to an accumulated displacement error threshold; ranking movements of the first joints (i) in accordance with the magnitudes of accumulated displacement errors when the first joints have magnitudes of accumulated displacement errors that exceed or are equal to the accumulated displacement error threshold, or (ii) in accordance with desired joint velocities when the second joints have magnitudes of accumulated displacement errors that are less than the accumulated displacement error threshold; selecting a second subset of joints from the plurality of joints based on the ranked movements of the first joints, where the second subset of joints comprises less than a total number of joints contained in the plurality of joints; and/or causing only the joints of the second subset to move during a second timeslot of a plurality of timeslots.

In some scenarios, the articulating arm is mounted on an unmanned ground vehicle. In those or other scenarios, the methods involve: transitioning each joint which is not contained in the first subset into a low power state; and/or transitioning a control mode for the articulating arm from a first mode in which the plurality of joints are to simultaneously move to a second mode in which movements of the plurality of joints are staggered, in response to reception of the command.

DESCRIPTION OF THE DRAWINGS

Embodiments will be described with reference to the following drawing figures, in which like numerals represent like items throughout the figures.

FIG. 1 is a perspective view of an UGV and a control unit.

FIGS. 7(a)-7(d) (collectively referred to herein as "FIG. 6") provide illustrations showing an illustrative desired overall arm movement command in accordance with a normal joint movement control algorithm.

FIGS. 8(a)-8(f) (collectively referred to herein as "FIG. 8") provide illustrations that are useful for understanding how joints of an articulating arm are selectively moved in accordance with a high strength joint movement control algorithm.

FIGS. 9A-9B (collectively referred to herein as "FIG. 9") provide a flow diagram of an illustrative method for controlling an articulating arm.

DETAILED DESCRIPTION

Figure 2:
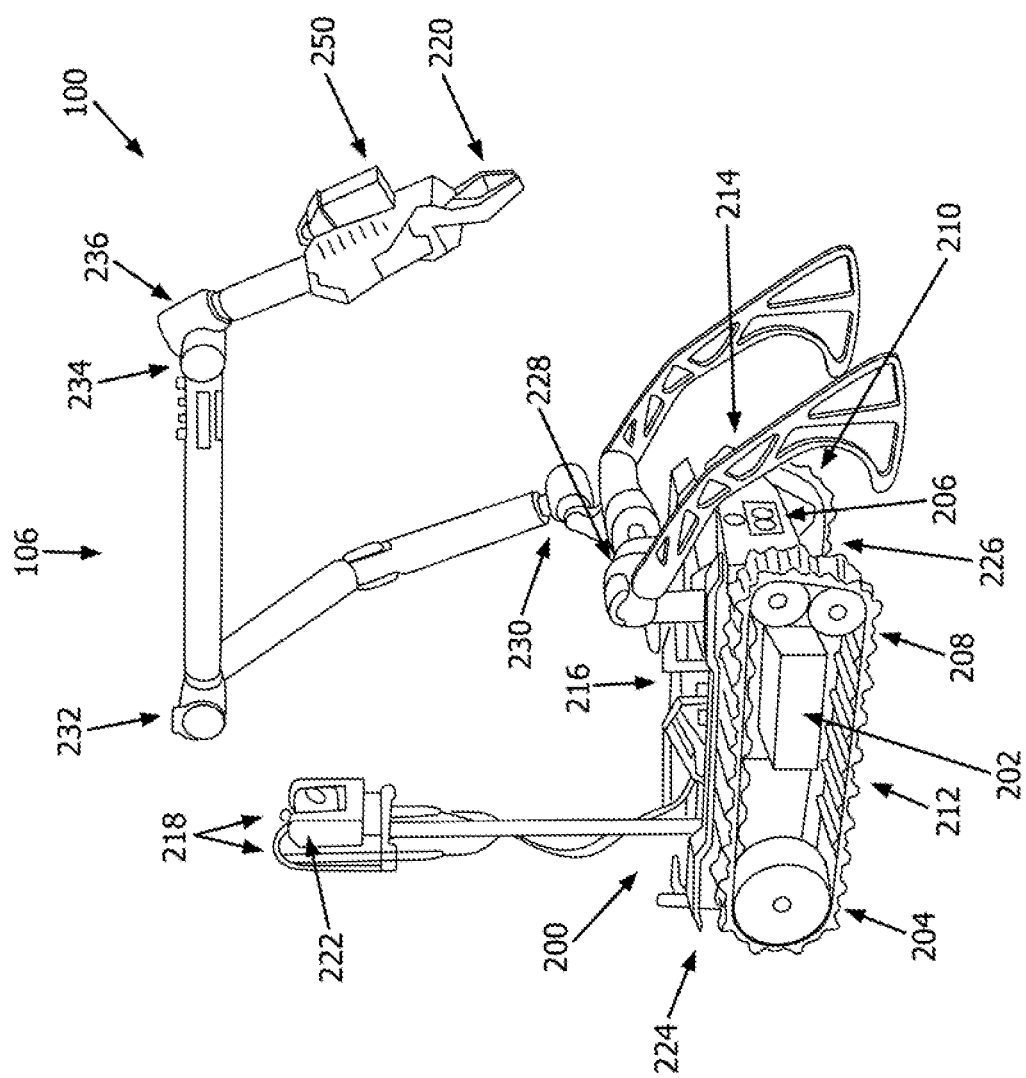
FIG. 2 is a perspective view of the UGV shown in FIG. 1.
Figure 3:
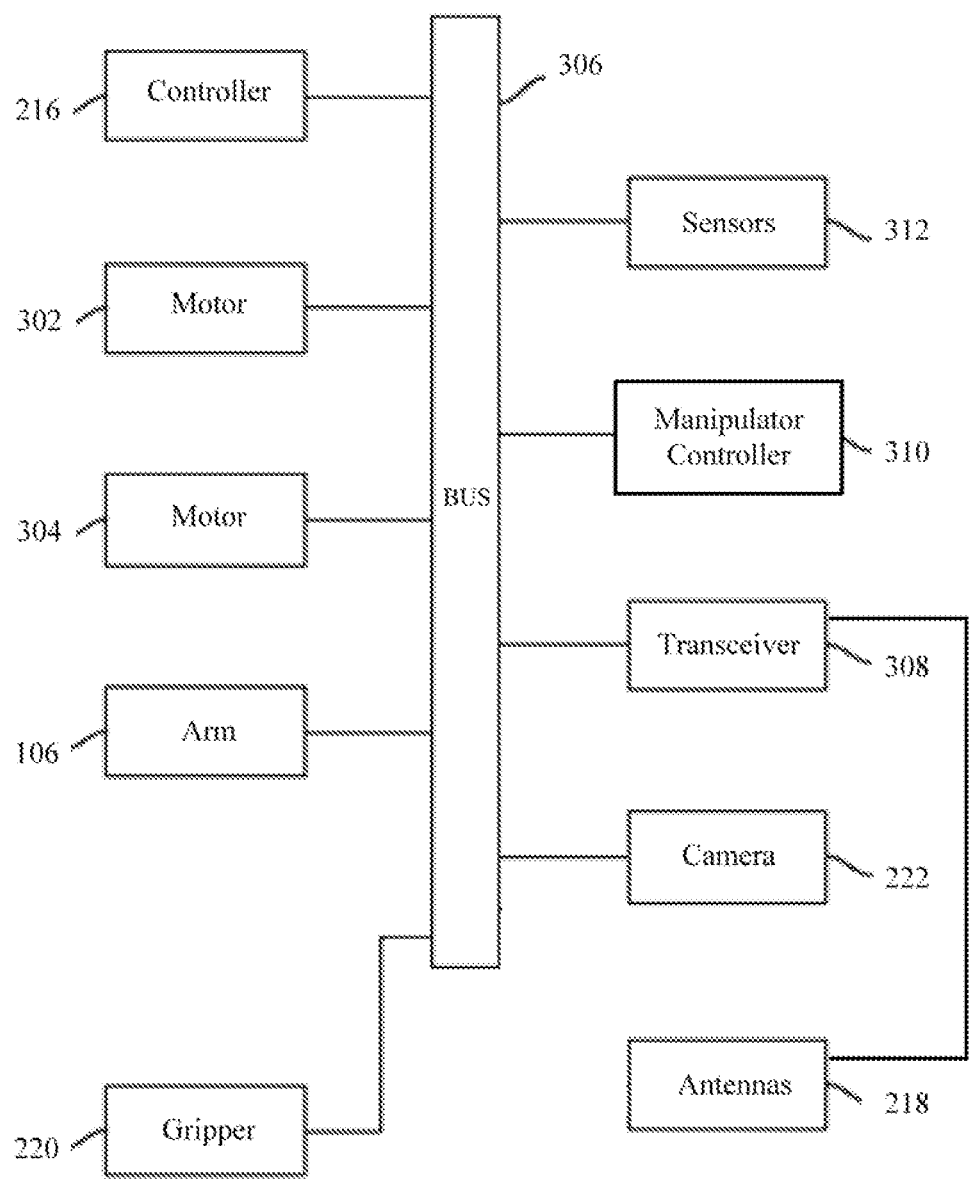
FIG. 3 is an illustration of various electrical and electronic components of the vehicle shown in FIGS. 1-2.
Figure 4:
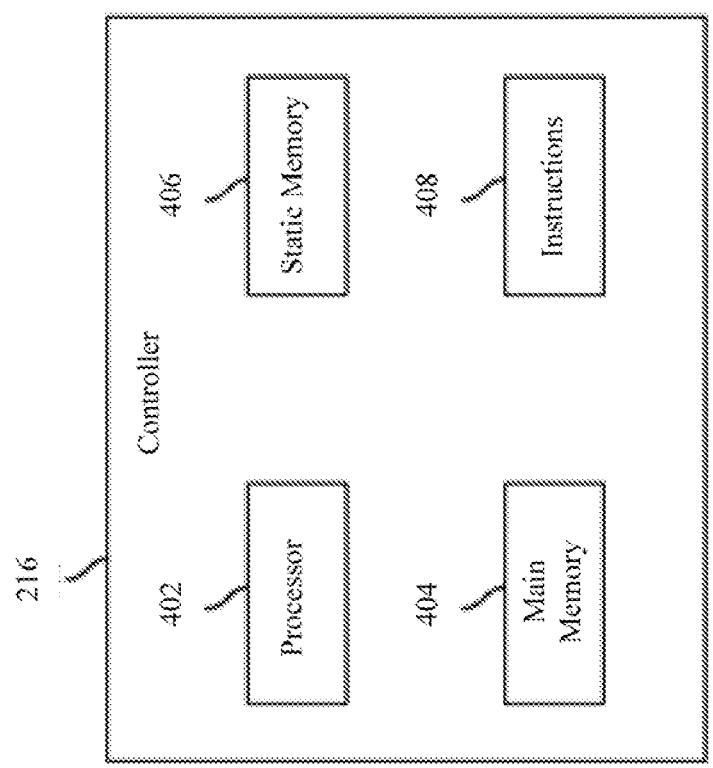
FIG. 4 is an illustration of various electrical and electronic components of the controller shown in FIG. 3.
Figure 5:
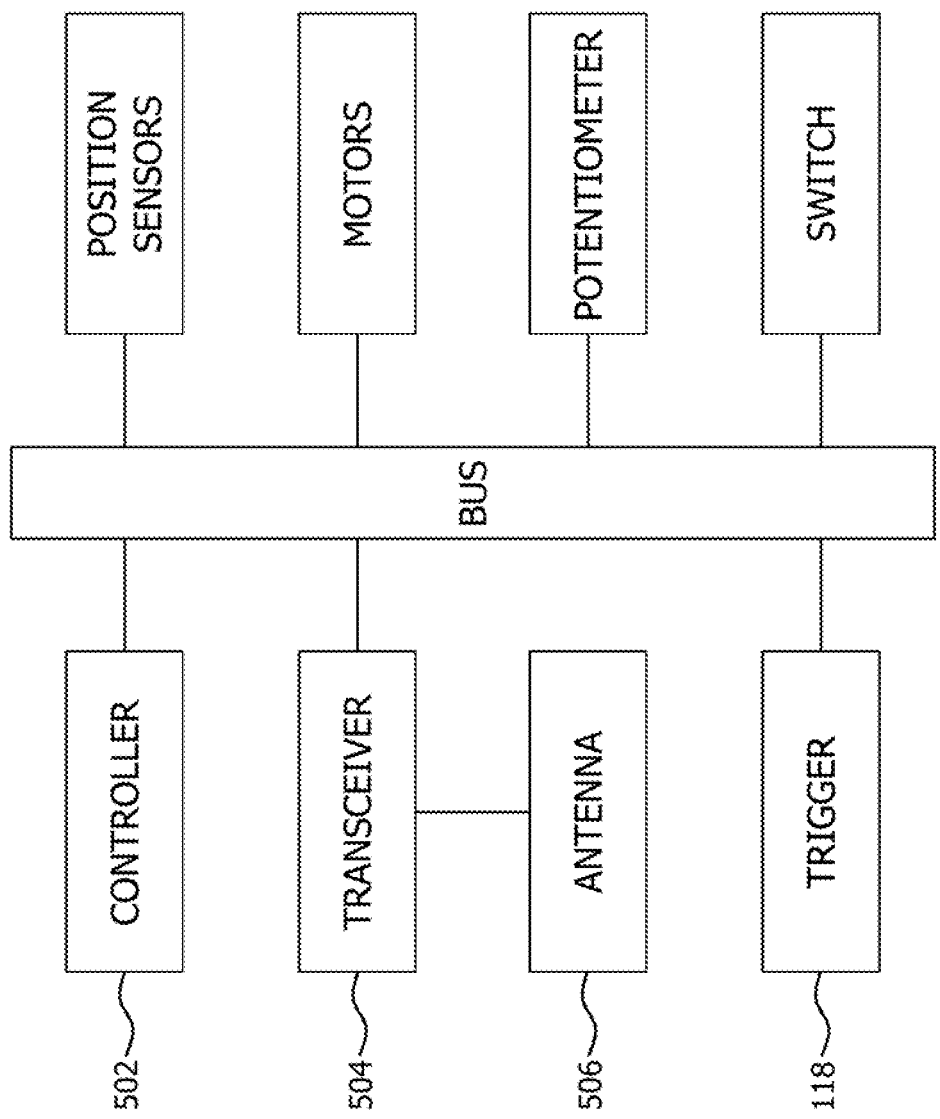
FIG. 5 is an illustration of various electrical and electronic components of the control unit shown in FIG. 1.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

The present disclosure concerns systems and methods for controlling robotic arms of UGVs or other devices in which power is limited. The present solution provides a novel way to minimize the overall power draw of the system while the robotic arm performs high strength tasks. In this regard, the present solution employs a timeslot based approach for controlling the joints of the robotic arms. The timeslot based approach involves assigning each joint of the robotic arm to a timeslot within which it can operate. The timeslot based approach is designed to reduce the total amount of power draw by only allowing a subset of joints to be active at any one time. Only the active joints draw power. The inactive joints are mechanically prevented from moving (e.g., via brake mechanism engagement) so that they are rigid and strong while effectively drawing no power as the robotic arm performs a certain task (e.g., lifts a relatively heavy object) during the given time period.

For example, a first joint is assigned to a first timeslot in which it is to be active, while a second joint is assigned to a second timeslot in which it is to be active. Accordingly, only the first joint is active and draws power during a first time period defined by the first timeslot. The second joint is prevented from moving (e.g., via joint brake mechanism engagement) during the first timeslot so that the second joint is rigid and strong while effectively drawing no power as the robotic arm performs a task (e.g., lifts a relatively heavy object) during the first time period. Similarly, only the second joint is active and draws power during a second time period defined by the second timeslot. The first joint is prevented from moving (e.g., via a joint brake mechanism engagement) during the second timeslot so that the first joint is rigid and strong while effectively drawing no power as the robotic arm continues to perform the task (e.g., lift relatively heavy objects) during the second time period. The present solution is not limited to the particulars of this example.

Notably, joint brake mechanisms of robotic arms have traditionally been engaged only for safety reasons (e.g., when certain errors occur or if the system is powered off). Thus, the selective engagement of the joint brake mechanisms to facilitate a power draw reduction by a robotic arm during high strength tasks is a novel feature of the present solution.

Referring now to FIGS. 1-4, there are provided illustrations of an illustrative UGV 100 and control unit 102. The illustrations of the UGV 100 and control unit 102 shown in FIGS. 1-2 are not drawn to scale. For example, the UGV 100 can be significantly larger than the control unit 102. However, FIGS. 1-2 are sufficient for understanding the present solution, and relationship between the two electronic components 100 and 102.

The UGV 100 is a motorized vehicle that operates without an on-board human presence. The UGV 100 can be used in various applications, such as EOD applications, search and rescue applications, hazardous material disposal applications, and/or surveillance applications. The UGV 100 can be remotely controlled using the control unit 102. In this regard, the control unit 102 enables a user's control of the UGV's operations and movement from a remote location.

The UGV 100 includes a body 200 comprising a rigid chassis 202. The UGV 100 also includes movable elements in the form of two rear wheels 204, 122 and two front wheels 208, 210. The rear wheels 204, 122 are mounted proximate a rear-end 224 of the rigid chassis 202 on opposite sides thereof. The front wheels 208, 210 are mounted proximate the front end 226 of the rigid chassis 202 on opposite sides thereof. In alternative embodiments, the movable elements can be structures other than wheels, such as articulating legs.

The UGV 100 further comprises actuating devices in the form of two variable-speed, reversible electric motors 302, 304. The motors 302, 304 are mounted on the body 200. The motor 302 is coupled to the front wheel 208 so that activation of the motor 302 causes the rear wheel 204 to rotate. The motor 304 is coupled to the rear wheel 122 so that activation of the motor 304 causes the rear wheel 122 to rotate. Additional motors (not shown) can be employed for directly driving the front wheels 208, 210.

The rear wheel 204 and the front wheel 208 are located on the same side of the UGV 100. The rear wheel 204 and the front wheel 208 are coupled by way of a tread or track 212. Rotation of the rear wheel 204 drives the track 212, which in turn causes the front wheel 208 to rotate. Similarly, the rear wheel 122 and the front wheel 210 are located on the same side of the UGV 100. The rear wheel 122 and the front wheel 210 are coupled by way of a tread or track 214. Rotation of the rear wheel 122 drives the track 214, which in turn causes the front wheel 210 to rotate.

The UGV 100 further includes a controller 216. The controller 216 comprises a processor 402 (e.g., a Central Processing Unit ("CPU")), a main memory 404 and a static memory 406. These electronic components 402-406 communicate with each other via a bus 306. The static memory 406 stores one or more sets of instructions 408 (e.g., software code). The instructions 408 implement one or more of the methodologies, procedures, or functions described herein. The instructions 408 can also reside, completely or at least partially, within the main memory 404 or the processor 402 during execution thereof thereby. The main memory 404 and the processor 402 also can constitute machine-readable media.

A manipulator controller 310 and sensors 312 are provided within the UGV 100. The sensors 312 are configured to generate sensor data indicating the positions of all moveable parts of the UGV 100. Accordingly, at least one sensor is provided to indicate the position of each joint 228, 230, 232, 234, 236 of the articulating arm 106. As such, the joint angles of the joints 228, 230, 232, 234, 236 are known at any given time. Sensors are also provided to indicate movement of the vehicle base of the UGV 100, such as wheel or track movement. The sensors 312 can include, but are not limited to, optical encoders, magnetic encoders, potentiometers, and resolvers. The outputs from the sensors 312 are used by the manipulator controller 310 for controlling movements of the articulating arm 106 and/or gripper 220.

The UGV 100 includes a transceiver 308 communicatively coupled to the processor 402 via the bus 306. The transceiver 308 communicates with the control unit 102 via a wireless communication link 104 (e.g., a Radio Frequency ("RF") transmission). One or more antennas 218 (is)are provided to facilitate the transmission and reception of information to and from the transceiver 308 of the UGV 100. In some scenarios, outputs from the sensors 312 are communicated from the UGV 100 to the control unit 102 for use thereby in subsequent movement operations for gripping, lifting or otherwise manipulating an external object by the UGV 100.

An articulating arm 106 is mounted on the body 200 of the UGV 100. The articulating arm 106 is equipped with at least one gripper 220, which is mounted on the freestanding end thereof. One or more cameras 206, 222 is(are) also mounted on the body 200 of the UGV 100. The articulating arm 106, gripper 220 and camera(s) 206, 222 can be remotely controlled via the control unit 102. Notably, another camera 250 is located at the gripper 220 of the robot.

The position of the UGV 100 is controlled through the selective activation and deactivation of the motors 302, 304 in response to control inputs generated by the control unit 102. Linear or straight-line travel of the UGV 100 is effectuated by the simultaneous activation of motors 302, 304 in the same direction and at the same speed so as to drive tracks 212, 214 in the same direction and at the same speed. Turning of the UGV 100 can be achieved by (1) simultaneously activating the motors 302, 304 in opposite directions or in the same direction at different speeds or (2) operating only one of the motors 302, 304.

The control unit 102 comprises a controller 502. The controller 502 can have a similar architecture as controller 216 of the UGV 100. As such, the controller 502 may include a processor (not shown) and memory (not shown) housed in a rigid casing (not shown). Instructions (not shown) may be stored in the memory. The instructions can be implemented as software code configured to implement one or more of the methodologies, procedures, or functions described herein. The processor and memory can constitute machine-readable media. In some scenarios, the instructions cause the controller 502 to control movements of all or a portion of the UGV 100 so as to cause the same to grasp, lift or other manipulate an external object.

The control unit 102 also includes a wireless transceiver 504 communicatively coupled to the controller 502. The transceiver 504 is configured to communicate with the transceiver 308 of the UGV 100 via an RF communication link 104. An antenna 506 is provided to facilitate the transmission and reception of RF signals to and from the control unit 102.

The control unit 102 further comprises an input device 108 for providing user inputs to the controller 502. In some scenarios, the input device 108 comprises a joystick to command the vehicle's movement. In other scenarios, the input device 108 comprises a hand grip 110 movably coupled to a base 112 via a plurality of linkages 114. The hand grip 110 includes a body 116 and a trigger 118. The body 116 is sized and shaped to be grasped by the hand of an operator. The trigger 118 is movable between a rest position and a fully depressed position. In this regard, the trigger 118 is mounted on the body 116 so that the user can pull or depress the trigger using his or her index finger while grasping the hand grip 110. Buttons 120 are disposed on the hand grip 110 for providing a means to control the grippers 220, camera 222 and other operational features of the manipulator arm 106.

The manner in which all or a portion of the UGV 100 is operated for grasping, lifting or otherwise manipulating an external object will now be described in relation to FIGS. 6-9. FIGS. 6-9 are useful for understanding two different algorithms implemented by the UGV 100 and/or control unit 102 for controlling movement of the articulating arm. A first method generally involves simultaneously moving all of the articulating arm joints at the same time in accordance with an arm movement command. A second method generally involves selectively and dynamically staggering movements of the articulating arm joints based on (i) how much the joints need to move in order for the arm movement command to be followed and/or (ii) relative accumulated displacement errors. A user can switch modes of the UGV 100 between a normal movement mode in which the first method is employed and a high strength mode in which the second method is employed. This mode switching can be facilitated by a button (e.g., button 120 of FIG. 1) or other user interface component (e.g., trigger 118 of FIG. 1) of the control unit 102. Additionally or alternatively, the mode of the UGV 100 can be switched automatically based on sensor data generated by sensor(s) (e.g., sensor(s) 312 of FIG. 3) that includes a measurement of the force exerted on the articulating arm.

Generally, the algorithm facilitates decision making by controller 216 and/or controller 502 with regard to which joints are to be active during a given timeslot or time period. This decision making is based on a joint movement prioritization. Movements of the joints 228, 230, 232, 234, 236 are dynamically and periodically assigned/re-assigned priority levels in accordance with an order defined by how much each joint 228, 230, 232, 234, 236 needs to move at a given time in order to follow a desired overall arm movement command (e.g., a desired overall lifting arm movement command for a path shown by line 600 in FIG. 6). The arm movement command may be input by a user using the control unit 102. Arm movement commands are well known in the art, and therefore will not be described in detail here. The order is determined based on accumulated displacement errors for the joints 228, 230, 232, 234, 236 as will be described in detail below. The order is selected so as to minimize the deviation of the arm movement from the desired trajectory during operations, as shown by line 602 of FIG. 6. Implementation of the above-described high strength algorithm for controlling UGV joint movement results in a decrease of instantaneous power draw required for high strength tasks (e.g., heavy lifting tasks).

Figure 6:
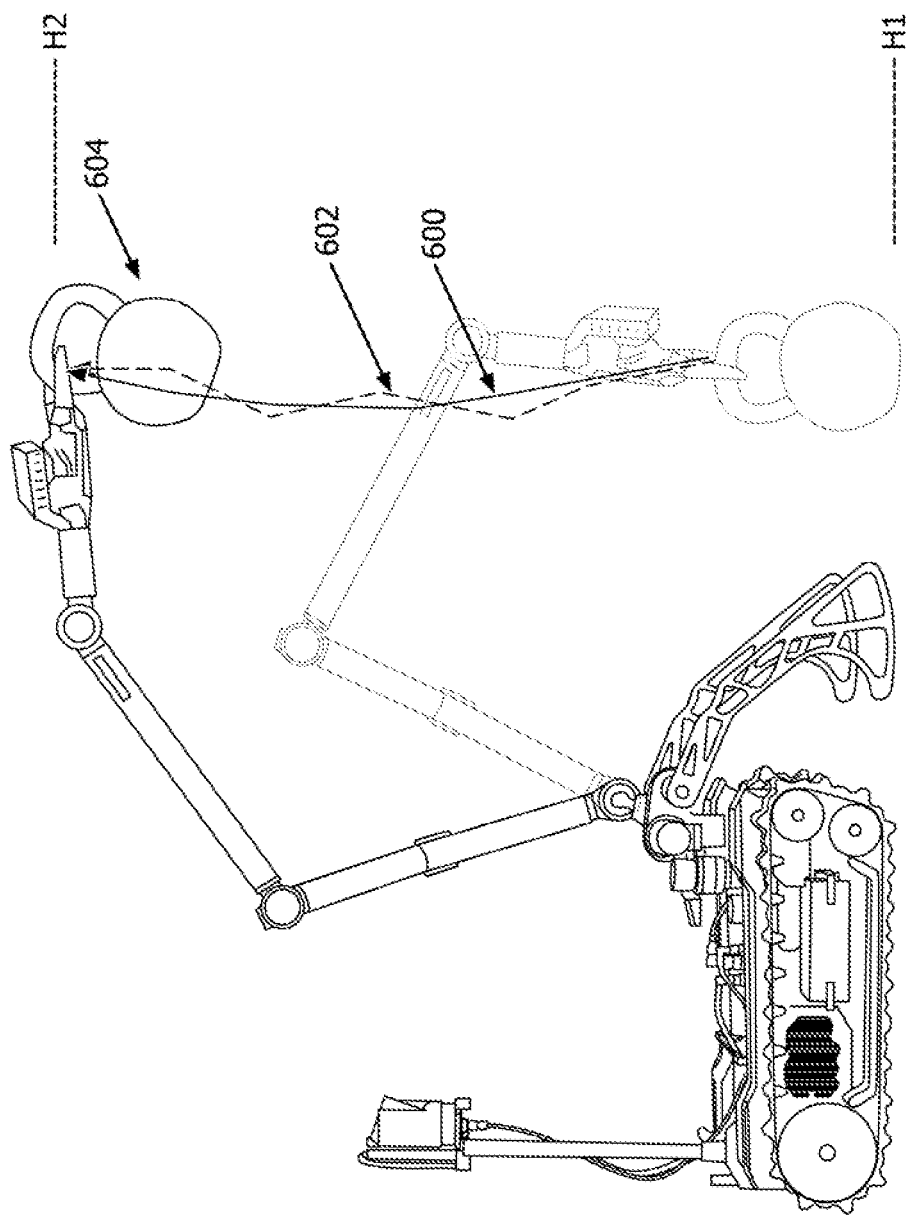
FIG. 6 provides an illustration showing two different paths for articulating arm movement.

Referring now to FIG. 7, there is provided an illustration that is useful for understanding how joints of an articulating arm are simultaneously moved in accordance with a normal joint movement control algorithm to follow a path shown by line 600 of FIG. 6. As shown in FIGS. 7(a)-(c), the UGV has an articulating arm with several joints. The present solution is applicable to any manipulator with a plurality of joints, or to any subset of manipulator joints. In this example, consider the set of joints including a shoulder joint 230, an elbow joint 232, and a wrist joint 234. The joints 230-234 are controlled for simultaneously moving in the respective directions shown by arrows 700, 702, 704 in accordance with an arm movement command for lifting an object 604. The positions of the articulating arm are shown in FIGS. 7(a)-7(c) at three different times T1, T2 and T3.

Graphs are provided in FIG. 7(d) that show the motor speed for each of the three joints 230-234. More specifically, the top graph 706 shows the motor speed for the shoulder joint 230. The middle graph 708 shows the motor speed for the elbow joint 232. The bottom graph 710 shows the motor speed for the wrist joint 234. Notably, this process for simultaneously moving the joints 230-234 requires a relatively large amount of instantaneous power draw by the articulating arm 106 for performing the high strength task of lifting the object 604.

As such, the present solution provides another technique for controlling joint movement that reduces the required instantaneous power draw by the articulating arm for performing high strength tasks such as lifting objects. The improved technique will now be described in relation to FIG. 8.

Referring now to FIG. 8, there is provided graphs 800-804, 812-816 that are useful for understanding how joints of an articulating arm 106 are selectively moved in accordance with a novel high strength joint movement control algorithm of the present solution. In FIG. 8, the joints 230, 232, 234 are controlled in a staggered manner so that the articulating arm 106 follows a path shown by line 602 of FIG. 6. The staggered order in which the joints 230, 232, 234 are moved in a plurality of timeslots TS1-TS6 is selected so as to minimize the deviation of the arm movement from the desired trajectory shown by line 600 of FIG. 6.

The high strength joint movement control algorithm employed in FIG. 8 implements the following rules.
Only a selected number of joints s (e.g., two) of the plurality of joints 230, 232, 234 are allowed to move during each timeslot TS1-TS6.
Any joint which is not allowed to move during a given timeslot is to be transitioned to a low power state at the beginning of the timeslot or time window.
The velocity or motor speed of each joint 230, 232, 234 is not to exceed respective maximum threshold values thr1, thr2, thr3 during any timeslot or time window.
For an initial timeslot, movements of the joints are to be prioritized based on how much each joint 230, 232, 234 needs to move at a given time in order to follow an arm movement command in accordance with the normal joint movement control algorithm (e.g., a lifting arm movement command for a path shown by line 600 in FIG. 6). The s joints that are selected for movement during the initial timeslot have the highest prioritized movements, i.e., the s joints that need to move the most at the given time in order to follow an arm movement command.
Notably, in some cases, at least one joint rotates, while another joint translates. Accordingly, the joint movements are converted into a common scale. For example, movements of a first joint are in degrees per second, while movements of a second joint are in inches per second. A rule is established that 20 degrees per second is equal to 1 foot per second. This, the inches per second movements are converted into degree per second movements in accordance with this rule.
For subsequent timeslots, select the s joints in accordance with the following operations.
Determine a prioritized order for the joints that have magnitudes of accumulated displacement error greater than an accumulated displacement error threshold value. The prioritized order lists the joints sequentially according to the values of their respective accumulated displacement errors (i.e., the first joint in the list has the largest magnitude of accumulated displacement error, while the last joint in the list has the lowest magnitude of accumulate displacement error). The accumulated displacement error represents the difference between a desired joint position and an actual joint position over a given time period. The accumulated displacement error may be defined by the following Mathematical Equation (1).

$$d\_error = \text{integral of } v\_des(t) - v\_act(t) \qquad (1)$$

where d_error represents the accumulated displacement error in degrees for a given joint over a given time period, $v\_des(t)$ represents the desired motor speed in degrees per second for a given joint at a given time, and $v\_act(t)$ represents the actual motor speed in degrees per second for a given joint at a given time.
If two joints have the same or substantially the same (e.g., ±5%) magnitude of accumulated displacement error, then assign a higher priority to the joint which needs to move the most at a given time in order for the arm movement command to be followed.
Select the n joints with the highest priority, where n is an integer that is equal to or less than s. n may have a value of zero in some scenarios where none of the joints have magnitudes of accumulated displacement error greater than an accumulated displacement error threshold value.
Determine if the value of s is greater than a total number of joints that have magnitudes of accumulated displacement error greater than the accumulated displacement error threshold value. If so, then determine a prioritized order for the remaining joints based on the joints' desired velocity at the current time. Select the s-n joints with the highest desired priority (or highest desired velocity at the current time).
For each one of the s selected joints, set the joint velocity or motor speed (i) equal to respective maximum threshold value thr1, thr2, thr3 if the magnitude of accumulated displacement error for the joint is greater than zero, or (ii) equal to a desired joint velocity or motor speed if the accumulated displacement error is zero.

During operations in the scenario of FIG. 8, an arm movement command is received at the UGV 100 from a control unit 102. The arm movement command is to lift an object 604 along a path shown by line 600 of FIG. 6. In response to this arm movement command, the controller 216 of the UGV 100 performs operations to control movements of the joints to lift the object 604 from a first height H1 to a second different height H2. Accordingly, the controller 216 performs the high strength based joint movement control algorithm at the start of each timeslot TS1-TS6 to determine which s joints of the plurality of joints 230, 232, 234 are to move during the given timeslot or time window. Each timeslot may have a fixed duration (e.g., 1 second), or may have different durations. The present solution is not limited in this regard. Notably, s is set to two in the following discussion. The present solution is not limited in this regard.

In accordance with the above-described rules, a decision is made at a first time t0 that the shoulder joint 230 and the elbow joint 232 are to move during a first timeslot TS1 since they need to move more than the wrist joint 234 at this time in order for the arm movement command to be followed. The amount of movement for each joint can be determined based on the joint velocities or motor speeds thereof that are required for the arm movement command to be followed at time t0 in accordance with a normal joint movement control algorithm. These joint velocities are also referred to herein as "desired joint velocities", and these motor speeds are also referred to herein as "desired motor speeds". Techniques for computing these desired joint velocities or motor speeds are well known in the art, and therefore will not be described here. Plots are provided in FIG. 7(d) that show the desired motor speeds required by each joint for the arm movement command to be followed in accordance with the normal joint movement control algorithm. As shown in FIG. 7(d), the desired motor speeds of the shoulder joint 230 and the elbow joint 232 are greater than the desired motor speed of the wrist joint 234 during a time period tp1. As such, the shoulder joint 230 and the elbow joint 232 are selected as the s (or two) joints that are to move during a first timeslot TS1.

Movement of the shoulder joint 230 during the first timeslot TS1 is illustrated in the top graph 800 of FIG. 8(a). Movement of the elbow joint 232 during the first timeslot TS1 is illustrated in the middle graph 802 of FIG. 8(a). Since the accumulated displacement errors for the shoulder joint 230 and elbow joint 232 are zero at time t0, the actual joint velocities or motor speeds thereof are respectively set equal to (i) the desired joint velocities or motor speeds provided that the same does not exceed the respective threshold values thr1, thr2 or (ii) the threshold values thr1, thr2 if the desired joint velocities or motor speeds exceed the same.

As shown in graphs 800 and 802 of FIG. 8(a), the shoulder joint 230 is controlled so as to (i) accelerate faster than the elbow joint 232 and (ii) have an actual motor speed that is greater than the actual motor speed of the elbow joint 232. Notably, the actual motor speed of the shoulder joint 230 is capped at the respective threshold value thr1 shown by line 806 of FIG. 8(a). Since the actual motor speed of the shoulder joint 230 was limited in the first timeslot TS1, the shoulder joint 230 began to accumulate a position displacement error as shown by bar 818 in bar graph 812 of FIG. 8(a). The elbow joint 232 has not begun to accumulate a displacement error during the first timeslot TS1 since it's actual motor speed was not limited by the threshold value thr2, as shown by graph 814 of FIG. 8(a).

A bottom graph 804 of FIG. 8(a) shows that the wrist joint 234 was prevented from moving during the first timeslot TS1. Joint movement can be prevented by transitioning the joint motor into a low power state at time t0. The low power state can be implemented by, for example, engaging brakes of the joint and/or electrically shorting the joint motor winding(s). Such joint brakes and motor windings are well known in the art, and therefore will not be described herein. Since the wrist joint 234 did not move at all during the first timeslot TS1, the wrist joint 234 has begun to accumulate a displacement error as shown by bar 820 in bar graph 816 of FIG. 8(a).

In accordance with the above-described rules, a decision is made at time t1 that the shoulder joint 230 and the elbow joint 232 are to move during a second timeslot TS2. This decision is made by comparing the magnitudes of accumulated displacement error associated with the three joints 230, 232, 234 to the accumulated displacement error threshold value. Since none of the magnitudes of accumulated displacement error exceeds the accumulated displacement error threshold value, the value of s is greater than the total number of joints that have magnitudes of accumulated displacement error greater than the accumulated displacement error threshold value. Accordingly, movements of the joints are prioritized based on the joints' desired joint velocities or motor speeds at the current time t1 in the process. As evident from FIG. 7(d), the desired motor speeds of the shoulder joint 230 and the elbow joint 232 both exceed the desired motor speed of the wrist joint 234 during time period tp2. As such, the shoulder joint 230 and the elbow joint 232 are selected as the two joints that are to move during the second timeslot TS2.

Movement of the shoulder joint 230 during the second timeslot TS2 is illustrated in graph 800 of FIG. 8(b). Movement of the elbow joint 232 during the second timeslot TS2 is illustrated in graph 802 of FIG. 8(b). Since the accumulated displacement error for the shoulder joint 230 is greater than zero at time t1 and throughout the second timeslot TS2, the actual joint velocity or motor speed thereof is set equal to the respective threshold value thr1 during the entire second timeslot TS2. Since the accumulated displacement error for the elbow joint 232 is zero at time t1, the initial actual joint velocity or motor speed thereof for the second timeslot TS2 is set equal to (i) the desired joint velocity or motor speed provided that the same does not exceed the respective threshold value thr2 or (ii) the threshold value thr2 if the desired joint velocity or motor speed exceeds the same. During the second timeslot TS2, the desired joint velocity or motor speed of the elbow joint 232 exceeds the threshold value thr2 at the end of the timeslot. Accordingly, the commanded motor speed thereof is limited to not exceed the threshold value thr2. As a result, the accumulated displacement error of the elbow joint 232 increases to a value greater than zero.

As shown in graphs 800 and 802 of FIG. 8(b), the shoulder joint 230 is controlled so as to continue to move at a motor speed equal to the threshold value thr1 while the elbow joint 232 moves at an increasing motor speed that is eventually capped by a threshold value thr2. The first threshold value thr1 is greater than the second threshold value thr2. The present solution is not limited in this regard. Any threshold values can be selected in accordance with a given application. Accordingly, the first and second threshold values thr1, thr2 can be the same or different (i.e., thr1≥thr2 or thr1≤thr2), and/or may be selectable by a user of the UGV 100. Since the motor speed of the shoulder joint 230 was still limited in the second timeslot TS2, the shoulder joint's accumulated displacement error has increased as shown by bar 822 in bar graph 812 of FIG. 8(b). During the second timeslot TS2, the elbow joint 232 began to accumulate a displacement error since its motor speed was also limited by the threshold value thr2. The accumulated displacement error of the elbow joint 232 is shown by bar 824 in bar graph 814 of FIG. 8(b).

Graph 804 of FIG. 8(b) shows that the wrist joint 234 was prevented from moving during the second timeslot TS2.

Since the wrist joint 234 did not move at all during the second timeslot TS2, the wrist joint's accumulated displacement error has increased as shown by bar 826 in bar graph 816 of FIG. 8(b).

In accordance with the above-described rules, a decision is made at time t2 that the shoulder joint 230 and the wrist joint 234 are to move during a third timeslot TS3. This decision is made by comparing the magnitudes of the accumulated displacement errors 822, 824, 826 associated with the three joints 230, 232, 234 to the accumulated displacement error threshold. Notably, the magnitudes of the accumulated displacement errors for joints 230, 234 exceed the accumulated displacement error threshold. Accordingly, movements for these joints 230, 234 are ranked in accordance with their magnitudes of accumulated displacement error. Movement of the wrist joint 234 is assigned a higher priority than movement of the shoulder joint 230 since the wrist joint's magnitude of accumulated displacement error is greater than the shoulder joint's magnitude of accumulated displacement error. Since s equals two and two of the joints 230, 234 have been ranked according to their accumulated displacement errors, these two joints are selected for movement during the third timeslot TS3.

Movement of the shoulder joint 230 during the third timeslot TS3 is illustrated in graph 800 of FIG. 8(c). Movement of the wrist joint 234 during the third timeslot TS3 is illustrated in graph 802 of FIG. 8(c). Since the magnitude of accumulated displacement error for the shoulder joint 230 and wrist joint 234 are greater than zero at time t2, the initial actual motor speeds thereof are set equal to the threshold values thr1, thr3. During the third timeslot TS3, the accumulated displacement error for the shoulder joint 230 becomes zero. At this time, the actual motor speed for the shoulder joint 230 is decreased to the desired motor speed as shown be the convergence of lines 830, 832 in graph 800 of FIG. 8(c). During the third timeslot TS3, the accumulated displacement error for the wrist joint 234 also becomes zero. At this time, the actual motor speed for the wrist joint 234 is set to the desired motor speed as shown be the convergence of lines 834, 836 in graph 804 of FIG. 8(c). Notably, the desired motor speed of the wrist joint 234 at this time is equal to the threshold value thr3. So in fact, the actual motor speed for the wrist joint 234 is not changed during the third timeslot TS3.

As shown in graph 800 of FIG. 8(c), the shoulder joint 230 is controlled so as to continue to move at a motor speed equal to the threshold value thr1 for a portion of the third timeslot TS3. The motor speed of the shoulder joint 230 is then slowed in a later portion of the third timeslot TS3 to the desired motor speed as discussed above. Since the actual motor speed shown by line 832 converged to the desired motor speed shown by line 830 at time t3, the accumulated displacement error of the shoulder joint 230 decreased to zero as shown in bar graph 812 of FIG. 8(c).

As shown in graph 804 of FIG. 8(c), the wrist joint 234 is controlled so as to move at a given motor speed that is (i) faster than the desired motor speed during the third timeslot TS3 for purposes of allowing the actual joint movement to catch up with the desired joint movement and (ii) limited such that the motor speed does not exceed a threshold thr3. Even though the motor speed of the wrist joint 234 was limited in the third timeslot TS3, the motor speed of the wrist joint 234 was sufficient to reduce the accumulated displacement error of the wrist joint at time t3. Accordingly, the accumulated displacement error of the wrist joint 234 at time t3 is zero as shown in the bar graph 816 of FIG. 8(c).

Since the elbow joint 232 was not selected for movement during the third timeslot TS3, it was transitioned into a low power state at time t2. The low power state can be implemented by, for example, engaging brakes of the joint and/or electrically shorting the joint motor winding(s). Such joint brakes and motor windings are well known in the art, and therefore will not be described herein. This lack of movement caused the accumulated displacement error of the elbow joint 232 to increase as shown by bar 828 of bar graph 814 in FIG. 8(c). The differences in the desired motor speed and the actual motor speed are illustrated by the spacing between lines 838 and 840 of graph 802 in FIG. 8(c).

In accordance with the above-described rules, a decision is made at a third time t3 that the elbow joint 232 and the wrist joint 234 are to move during a fourth timeslot TS4. This decision is made by comparing the magnitude of accumulated displacement error for the three joints 230, 232, 234 to the accumulated displacement error threshold. Only the magnitude of the accumulated displacement error for the elbow joint 232 exceeds the accumulated displacement error threshold. As such, movement of the elbow joint 232 is given the highest priority. Since s is greater than the total number of joints that have magnitudes of accumulated displacement error greater than the accumulated displacement error threshold (i.e., 2>1), movements of the remaining joints 230, 234 are ranked based on the joints' desired joint velocity or motor speed. As shown in FIG. 7(d), the desired motor speed of the wrist joint 234 exceeds the desired motor speed of the shoulder joint 230 during the time period tp4. As such, movement of the wrist joint 234 is ranked higher than movement of the shoulder joint 230. Accordingly, the two joints with the highest rankings are selected for movement during the fourth timeslot TS4, i.e., the elbow joint 232 and the wrist joint 234 are selected.

Movement of the elbow joint 232 during the fourth timeslot TS4 is illustrated in the graph 802 of FIG. 8(d). Since the magnitude of the accumulated displacement error for the elbow joint 232 is greater than zero at time t3, the initial actual motor speed thereof is set equal to the threshold value thr2. Notably, the accumulated displacement error for the elbow joint 232 never reaches zero during the fourth timeslot TS4. Accordingly, the actual motor speed of the elbow joint 232 remains set to the threshold value thr2 throughout the fourth timeslot TS4. As a result of the limited motor speed of the elbow joint 232, the magnitude of the accumulated displacement error for the elbow joint 232 decreased slightly as shown by bar 842 of FIG. 8(d).

Movement of the wrist joint 234 during the fourth timeslot TS4 is illustrated in the graph 804 of FIG. 8(d). Since the accumulated displacement error for the wrist joint 234 is equal to zero at time t3, the initial actual motor speed for the wrist joint 234 is set to the desired motor speed. During the fourth timeslot TS4, the magnitude of the accumulated displacement error for the wrist joint 234 increases. At this time, the actual motor speed for the wrist joint 234 is reset to the threshold value thr3. Notably, the desired motor speed at time t3 equals the threshold value thr3. In effect, the actual motor speed of the wrist joint 234 remains at the threshold value thr3 throughout the fourth timeslot TS4. As a result of this continued limited motor speed of the wrist joint 234, the magnitude of the accumulated displacement error for the wrist joint 234 increased as shown by bar 844 in graph 816 of FIG. 8(d).

Since the shoulder joint 230 was not selected for movement during the fourth timeslot TS4, it was transitioned into a low power state at time t3. The low power state can be implemented by, for example, engaging brakes of the joint and/or electrically shorting the joint motor winding(s). Such joint brakes and motor windings are well known in the art, and therefore will not be described herein. This lack of movement caused the magnitude of the accumulated displacement error of the shoulder joint 230 to increase as shown by bar 846 of bar graph 812 in FIG. 8(*d*).

In accordance with the above-described rules, a decision is made at a time t4 that the shoulder joint 230 and the elbow joint 232 are to move during a fifth timeslot TS5. This decision is made by comparing the magnitudes of the accumulated displacement errors 842, 844, 846 for the three joints 230, 232, 234 at time t4 to the accumulated displacement error threshold. Notably, the magnitudes of all three accumulated displacement errors 842, 844, 846 exceed the accumulated displacement error threshold. Accordingly, movements of the joints 230, 232, 234 are ranked or prioritized based on their magnitudes of accumulated displacement errors 842, 844, 846. Since the magnitudes of accumulated displacement errors 842 and 846 are greater than the magnitude of accumulated displacement error 844, the shoulder joint 230 and the elbow joint 232 are selected for movement during the fifth timeslot TS5.

Movement of the shoulder joint 230 during the fifth timeslot TS5 is illustrated in the graph 800 of FIG. 8(*e*). Since the magnitude of accumulated displacement error for the shoulder joint 230 is greater than zero at time t4, the initial actual motor speed thereof is set equal to the threshold value thr1. It should be noted that in the scenario of FIG. 8 all motor speeds are positive. In cases where the motor speed commands are positive and negative, the speed of the motor would be limited to be no greater than +thr1 and no less than −thr1 (i.e., there is a speed limit in both directions). In situations where the accumulated error for a joint was negative, the initial actual motor speed would be set to −thr1 (until the accumulated displacement error returns back to zero). Notably, the accumulated displacement error for the shoulder joint 230 does reach zero near the end of the fifth timeslot TS5 as shown by bar graph 812 of FIG. 8(*e*). Accordingly, the actual motor speed of the shoulder joint 230 begins to decrease towards the desired motor speed at the end of the fifth timeslot TS5.

Movement of the elbow joint 232 during the fifth timeslot TS5 is illustrated in the graph 802 of FIG. 8(*e*). Since the magnitude of the accumulated displacement error for the elbow joint 232 is greater than zero at time t4, the initial actual motor speed thereof is set equal to the threshold value thr2. The actual motor speed of the elbow joint 232 remains at the threshold value thr2 throughout the fifth timeslot TS5 because the accumulated displacement error thereof never reaches zero during the fifth timeslot TS5. The accumulated displacement error at the end of the fifth timeslot TS5 is shown by bar 848 in bar graph 814 of FIG. 8(*e*). Notably, the accumulated displacement error for the elbow joint 232 decreased during the fifth timeslot TS5.

Since the wrist joint 234 was not selected for movement during the fifth timeslot TS5, it was transitioned into a low power state at time t4. The low power state can be implemented by, for example, engaging brakes of the joint and/or electrically shorting the joint motor winding(s). Such joint brakes and motor windings are well known in the art, and therefore will not be described herein. This lack of movement caused the accumulated displacement error of the wrist joint 234 to increase as shown by bar 850 of bar graph 816 in FIG. 8(*e*).

In accordance with the above-described rules, a decision is made at a time t5 that the elbow joint 232 and the wrist joint 234 are to move during a sixth timeslot TS6. This decision is made by comparing the magnitudes of the accumulated displacement errors for the three joints 230, 232, 234 at time t5 to the accumulated displacement error threshold. The magnitudes of the accumulated displacement errors of joints 232, 234 exceed the accumulated displacement error threshold, while the magnitude of the accumulated displacement error of joint 230 does not exceed the accumulated displacement error threshold. Accordingly, movements of joints 232, 234 are ranked or prioritized based on their accumulated displacement errors at time t5. Since the magnitude of the accumulated displacement error represented by bar 850 in FIG. 8(*e*) is greater than the magnitude of the accumulated displacement error represented by bar 848 in FIG. 8(*e*), movement of the wrist joint 234 is ranked higher than movement of elbow joint 232. Still, since s equals two, both ranked joints 232 and 234 are selected for movement during the sixth timeslot TS6.

Movement of the elbow joint 232 during the sixth timeslot TS6 is illustrated in the graph 802 of FIG. 8(*f*). Since the magnitude of the accumulated displacement error for the elbow joint 232 is greater than zero at time t5, the initial actual motor speed thereof is set equal to the threshold value thr2. Notably, the accumulated displacement error for the elbow joint 232 does reach zero near the end of the sixth timeslot TS6 as shown by bar graph 814 of FIG. 8(*f*). Accordingly, the actual motor speed of the elbow joint 232 decreases to the desired motor speed in the sixth timeslot TS6.

Movement of the wrist joint 234 during the sixth timeslot TS6 is illustrated in the graph 804 of FIG. 8(*f*). Since the magnitude of the accumulated displacement error for the wrist joint 234 is greater than zero at time t5, the initial actual motor speed thereof is set equal to the threshold value thr3. Notably, the accumulated displacement error for the wrist joint 234 does reach zero near the end of the sixth timeslot TS6 as shown by bar graph 816 of FIG. 8(*f*). Accordingly, the actual motor speed of the wrist joint 234 decreases to the desired motor speed in the sixth timeslot TS6.

Since the shoulder joint 230 was not selected for movement during the sixth timeslot TS6, it was transitioned into a low power state at time t5. The low power state can be implemented by, for example, engaging brakes of the joint and/or electrically shorting the joint motor winding(s). Such joint brakes and motor windings are well known in the art, and therefore will not be described herein. This lack of movement caused the accumulated displacement error of the shoulder joint 230 to remain at zero as shown in bar graph 812 in FIG. 8(*f*).

Notably, the actual path of movement for the articulating arm 106 in the scenario of FIG. 8 is shown by line 602 of FIG. 6. As can be seen in FIG. 6, the movement represented by line 602 is not as smooth as the desired movement represented by line 600. The movement of the articulating arm 106 can be smooth by shortening the timeslots TS1-TS6. Accordingly, the timeslots can have the same or different fixed values, or alternatively can each have a variable value that may be selectively and dynamically selected at times t1, t2, t3, t4, t5 based on a pre-defined maximum amount of deviation that the articulating arm's actual movement is to be from the articulating arm's desired movement at any given time. For example, a time slot duration is shortened when the magnitude of the one or more of the accumulated displacement errors exceeds a first maximum accumulated displacement error threshold, and is increased when the magnitude of all of the accumulated displacement errors falls below a second maximum accumulated displacement error threshold. The present solution is not limited to the particulars of this example.

The above-described timeslot based joint movement control algorithm of the present solution may be implemented in the following illustrative pseudo-code. The present solution is not limited to the particulars of the following illustrative pseudo-code.
Defining terms:
Timestep duration=t_step
Total number of joints in arm=n
Total number of joints allowed to move simultaneously=s
Maximum allowable joint velocities=v_max [vector of n values]
Desired joint velocities vs time=v_des(t) [vector of n values]
Actual joint velocities vs time=v_act(t) [vector of n values]
Accumulated displacement error=d_error [vector of n values]
Minimum displacement error threshold=d_error_thresh [vector of n values]
At the beginning of a time period of duration t_step:
  (1) Rank joints according to which joints need to move the most
    Top priority: joint where magnitude of d_error is the highest
      (only if the magnitude of d_error is greater than d_error_thresh for that joint)
    Next priority: joint with the next highest magnitude of d_error
      (only if the magnitude of d_error is greater than d_error_thresh for that joint)
    Continue ranking joints using this method.
    If the number of joints with d_error>d_error_thresh is less than s, prioritize the remaining joints based on which have the highest desired velocity at the current time in v_des(t).
  (2) Command the top priority joints to move, limited to a total of s different joints, resulting in v_act(t)
    If d_error for a joint is greater than zero, the movement rate for a joint should be equal to v_max for that joint (in the direction indicated by whether d_error is positive or negative for that joint).
    If d_error for a joint is zero at any time during the time period, the v_act(t) commanded for that joint should be v_des(t) for that joint
  (3) Keep track of d_error for each joint
After time period of duration t_step is complete, begin new time period (return to step (1) above).

Figure 9A:
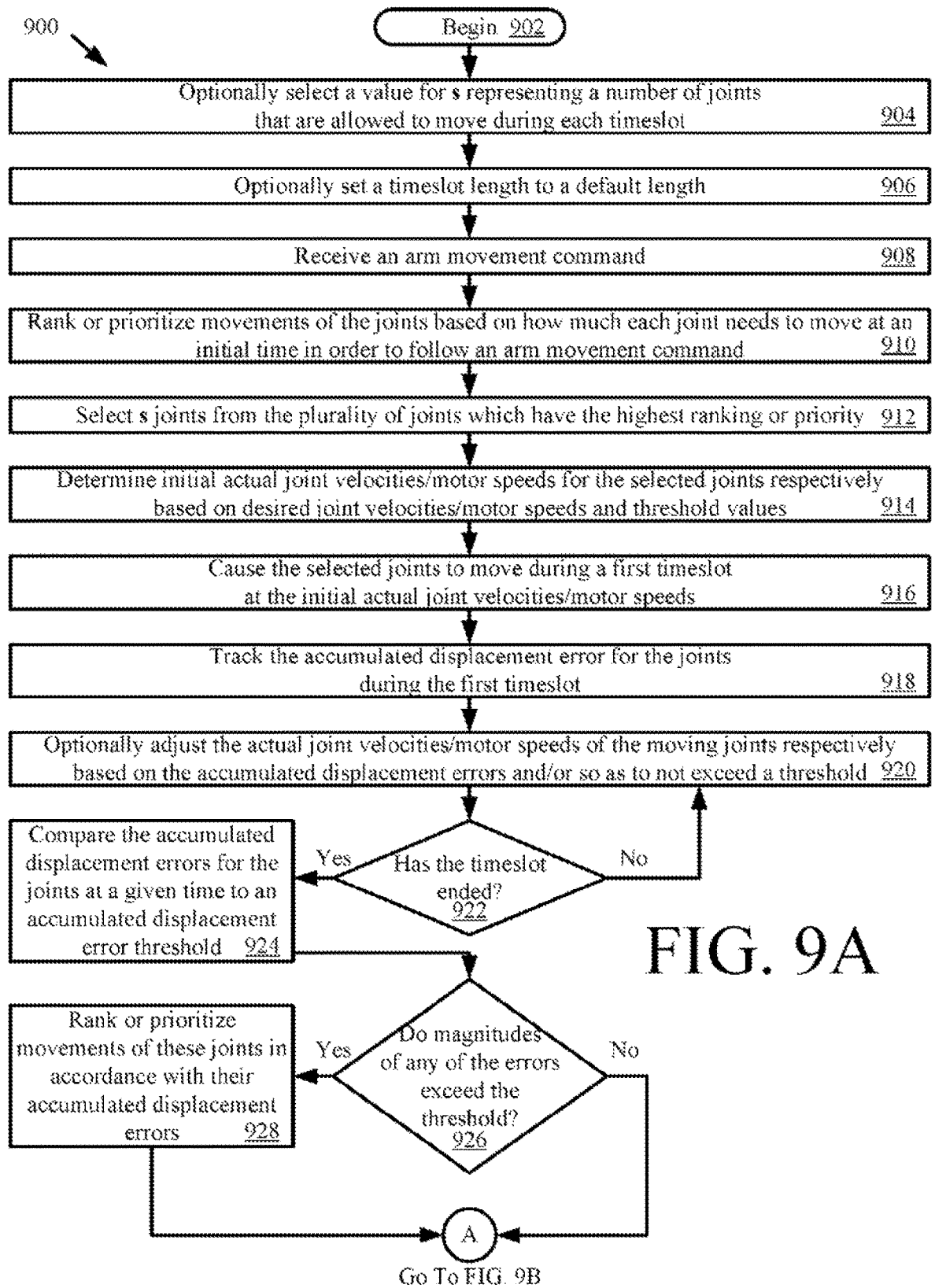

Referring now to FIG. 9, there is provided a flow diagram of an illustrative method 900 for controlling an articulating arm (e.g., articulating arm 106 of FIG. 1). As shown in FIG. 9A, method 900 begins at 902 and continues to 904 where a value of s is optionally selected by a user of the articulating arm. The value of s represents a number of joints that are allowed to move during each timeslot (e.g., each timeslot TS1-TS6 of FIG. 8). In 906, a timeslot length is optionally set to a default length (e.g., 1 second).

In 908, an arm movement command is received by a controller (e.g., controller 216 of FIG. 2) of the articulating arm. For example, the arm movement command is to lift an object (e.g., object 604 of FIG. 6) from a first height (e.g., height H1 of FIG. 6) to a second height (e.g., height H2 of FIG. 6). Accordingly, the control mode for the articulating arm is automatically switched from a first mode in which a normal joint movement control algorithm is employed to a second mode in which a high strength joint movement control algorithm is employed. The present solution is not limited by the particulars of this example. The control mode may optionally be changed by the user prior to inputting the arm movement command into the system. Also, in some cases, the system only operates in a single mode, i.e., the high strength joint movement control algorithm.

In 910, movements of the joints (e.g., joints 228, 230, 232, 234 of FIG. 2) are ranked or prioritized based on how much each joint needs to move at an initial time (e.g., time t0 of FIG. 8) in order to follow the arm movement command received in 908. The amount of movement for each joint can be determined based on the desired joint velocities or motor speeds thereof. Techniques for computing desired joint velocities or motor speeds are well known in the art, and therefore will not be described here.

In 912, s joints are selected from the plurality of joints which have the highest ranking or priority. Next, initial actual joint velocities or motor speeds are determined for the selected joints, as shown by 914. These determinations are made respectively based on desired joint velocities/motor speeds and threshold values (e.g., threshold values thr1, thr2, thr3 of FIG. 8). The selected joints are then caused to move during a first timeslot (e.g., timeslot TS1 of FIG. 8) at the initial actual joint velocities or motor speeds, as shown by 916. The accumulated displacement error for the joints are tracked during the first timeslot, as shown by 918. In 920, the actual joint velocities or motor speeds of the moving joints are optionally adjusted respectively based on the accumulated displacement errors and/or so as to not exceed a predefined joint velocity limit threshold (e.g., threshold values thr1, thr2, thr3 of FIG. 8).

In 922, a decision is made as to whether the timeslot has ended. If not [922:NO], method 900 returns to 920. If so [922:YES], method 900 continues to 924 where the magnitudes of the accumulated displacement errors for the joints at a given time (e.g., time t1 of FIG. 8) are each compared to an accumulated displacement error threshold. If none of the magnitudes of the accumulated displacement errors exceed the accumulated displacement error threshold [926:NO], then method 900 continues with 930 of FIG. 9B. 930 will be described below. If one or more magnitudes of the accumulated displacement errors exceed the accumulated displacement error threshold [926:YES], then 928 is performed where movements are ranked or prioritized for the joints with magnitudes of accumulated displacement errors exceeding the accumulated displacement error threshold. This ranking or prioritization is made in accordance with the joints' accumulated displacement errors (i.e., the highest ranked joint has the greatest magnitude of accumulated displacement error, and the lowest ranked joint has the smallest magnitude of accumulated displacement error). Upon completing 928, method 900 continues with 930 of FIG. 9B.

Referring now to FIG. 9B, a decision is made as to whether s is greater than the total number of joints that have magnitudes of accumulated displacement errors greater than the accumulated displacement error threshold. If not [930:NO], then 932 is performed where s joints are selected which have the highest ranking or priority determined in 928. If so [930:YES], then 934-936 are performed where: the remaining joints are ranked or prioritized based on the joints' desired joint velocities or motor speeds at the current time (e.g., time t2 of FIG. 8); the n joints which were ranked or prioritized in 928 are selected; and s-n joints are selected which were ranked or prioritized in 934 and have the highest ranking or priority.

In 938, actual joint velocities or motor speeds are determined for the selected joints respectively based on desired joint velocities or motor speeds and threshold values (e.g., threshold values thr1, thr2, thr3 of FIG. 8). The timeslot length may optionally be adjusted in 940 for smoothing movement of the articulating arm. For example, the timeslot length may be decreased from 1 second to 0.5 seconds. The present solution is not limited to the particulars of this example. In 942, the selected joints are caused to move during a next timeslot (e.g., timeslot TS2 of FIG. 8) at the actual joint velocities or motor speeds determined in 938. The accumulated displacement errors for the joints are tracked during the timeslot, as shown by 944. In 946, the actual joint velocities or motor speeds of the moving joints are optionally adjusted respectively based on the accumulated displacement error and/or so as to not exceed a predefined joint velocity limit threshold (e.g., threshold values thr1, thr2, thr3 of FIG. 8).

In 948, a decision is made as to whether the timeslot has ended. If not [948:NO], then method 900 returns to 946. If so [948:YES], then method 900 continues with 950 where a decision is made as to whether all of the accumulated displacement errors are equal to zero. If not [950:NO], method 900 returns to 924. Otherwise, 954 is performed where method 900 ends or other processing is performed.

All of the apparatus, methods, and algorithms disclosed and claimed herein can be made and executed without undue experimentation in light of the present disclosure. While the invention has been described in terms of preferred embodiments, it will be apparent to those having ordinary skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those having ordinary skill in the art are deemed to be within the spirit, scope and concept of the invention as defined.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

I claim:

1. A method for controlling movement of an articulating arm having a plurality of joints, comprising:
   receiving, by a controller, a command to perform a task by the articulating arm;
   transitioning from using a first joint movement control algorithm to a second joint movement control algorithm which is different from the first joint movement control algorithm, wherein the first joint movement control algorithm is configured to cause simultaneous movement of the plurality of joints and the second joint movement control algorithm is configured to cause staggered movement of at least some of the plurality of joints;
   performing, by the controller, the second joint movement control algorithm to:
      rank the joints based on desired operations of the joints or associated motors during a given time period in a process for completing the task; and
      select a first subset of joints based on a ranking of the plurality of joints, where the first subset of joints comprises less than a total number of joints contained in the plurality of joints; and
   increasing a lifting strength of the articulating arm when using the second joint movement control algorithm as compared to the first joint movement control algorithm by selectively limiting the instantaneous power draw of the articulating arm during a first timeslot of a plurality of timeslots associated with a duration of the task, wherein the instantaneous power draw is selectively limited by causing only the joints of the first subset to move during the first timeslot.

2. The method according to claim 1, further comprising determining an actual joint velocity for each of the joints in the first subset based on a threshold value and a desired joint velocity determined in accordance with the first joint movement control algorithm configured for simultaneously controlling movements of said joints.

3. The method according to claim 2, further comprising changing the actual joint velocity during the first timeslot based on an accumulated displacement error or so as to not exceed a predefined threshold.

4. The method according to claim 1, further comprising tracking accumulated displacement errors for the plurality of joints during the first timeslot.

5. The method according to claim 4, further comprising identifying first joints from the plurality of joints by comparing each magnitude of the accumulated displacement errors to an accumulated displacement error threshold.

6. The method according to claim 5, further comprising ranking movements of the first joints (i) in accordance with the magnitudes of the accumulated displacement errors when the first joints have magnitudes of accumulated displacement errors that exceed or are equal to the accumulated displacement error threshold, or (ii) in accordance with desired joint velocities when second joints have magnitudes of accumulated displacement errors that are less than the accumulated displacement error threshold.

7. The method according to claim 6, further comprising selecting a second subset of joints from the plurality of joints based on the ranked movements of the first joints, where the second subset of joints comprises less than a total number of joints contained in the plurality of joints.

8. The method according to claim 7, further comprising causing only the joints of the second subset to move during a second timeslot of a plurality of timeslots.

9. The method according to claim 1, wherein the articulating arm is mounted on an unmanned ground vehicle.

10. The method according to claim 1, further comprising transitioning each joint which is not contained in the first subset into a low power state.

11. A system, comprising:
   an articulating arm having a plurality of j oints;
   a processor communicatively coupled to the articulating arm; and
   a non-transitory computer-readable storage medium comprising programming instructions that are configured to cause the processor to implement a method for controlling movement of the articulating arm, wherein the programming instructions comprise instructions to:
      receive a command to perform a task by the articulating arm;
      transition from using a first joint movement control algorithm to a second joint movement control algorithm which is different from the first joint movement control algorithm, wherein the first joint movement control algorithm is configured to cause simultaneous movement of the plurality of joints and the second joint movement control algorithm is configured to cause staggered movement of at least some of the plurality of joints;

rank movements of the joints based on desired operations of the joints or associated motors during a given time period in a process for completing the task in accordance with the second joint movement control algorithm;

select a first subset of joints based on a ranking of the plurality of joints, where the first subset of joints comprises less than a total number of joints contained in the plurality of joints; and increase a lifting strength of the articulating arm when using the second joint movement control algorithm as compared to the first joint movement control algorithm by selectively limiting the instantaneous power draw of the articulating arm during a first timeslot of a plurality of timeslots associated with a duration of the task, wherein the instantaneous power draw is selectively limited by causing only the joints of the first subset to move during the first timeslot.

12. The system according to claim 11, wherein the programming instructions comprise instructions to determine an actual joint velocity for each of the joints in the first subset based on a threshold value and a desired joint velocity determined in accordance with the first joint movement control algorithm configured for simultaneously controlling movements of said joints.

13. The system according to claim 12, wherein the programming instructions comprise instructions to change the actual joint velocity during the first timeslot based on an accumulated displacement error or so as to not exceed a predefined threshold.

14. The system according to claim 11, wherein the programming instructions comprise instructions to track accumulated displacement errors for the plurality of joints during the first timeslot.

15. The system according to claim 14, wherein the programming instructions comprise instructions to identify first joints from the plurality of joints by comparing each magnitude of the accumulated displacement errors to an accumulated displacement error threshold.

16. The system according to claim 15, wherein the programming instructions comprise instructions to rank movements of the first joints (i) in accordance with the magnitudes of the accumulated displacement errors when the first joints have magnitudes of accumulated displacement errors that exceed or are equal to the accumulated displacement error threshold, or (ii) in accordance with desired joint velocities when second joints have magnitudes of the accumulated displacement errors that are less than the accumulated displacement error threshold.

17. The system according to claim 16, wherein the programming instructions comprise instructions to select a second subset of joints from the plurality of joints based on the ranked movements of the first joints, where the second subset of joints comprises less than a total number of joints contained in the plurality of joints.

18. The system according to claim 17, wherein the programming instructions comprise instructions to cause only the joints of the second subset to move during a second timeslot of a plurality of timeslots.

19. The system according to claim 11, wherein the articulating arm is mounted on an unmanned ground vehicle.

20. The system according to claim 11, wherein the programming instructions comprise instructions to transition each joint which is not contained in the first subset into a low power state.

* * * * *